US010628418B2

(12) United States Patent
Weyerhaeuser et al.

(10) Patent No.: US 10,628,418 B2
(45) Date of Patent: Apr. 21, 2020

(54) DATA DRIVEN MULTI-PROVIDER PRUNING FOR QUERY EXECUTION PLAN (71) Applicant: SAP SE, Walldorf (DE)

(72) Inventors: Christoph Weyerhaeuser, Heidelberg (DE); Tobias Mindnich, Walldorf (DE); Johannes Merx, Heidelberg (DE); Joerg Schad, Leimen (DE); Julian Schwing, Mannheim (DE); Daniel Patejdl, Karlsruhe (DE)

(73) Assignee: SAP SE, Walldorf (DE)

( * ) Notice: Subject to any disclaimer, the term of this patent is extended or adjusted under 35 U.S.C. 154(b) by 497 days.

(21) Appl. No.: 14/540,789

(22) Filed: Nov. 13, 2014

(65) Prior Publication Data

US 2016/0140174 A1 May 19, 2016

(51) Int. Cl.
*G06F 16/2453* (2019.01)

(52) U.S. Cl.
CPC .............................. *G06F 16/24542* (2019.01)

(58) Field of Classification Search
CPC .............. G06F 17/30463; G06F 17/30; G06F 17/30823
USPC .............. 707/718, 713, 714, 759, 769, 797, 707/999.002, 999.004, E17.014, E17.017
See application file for complete search history.

(56) References Cited

U.S. PATENT DOCUMENTS

| | | | |
|---|---|---|---|
| 6,092,062 A * | 7/2000 | Lohman | G06F 17/30463 |
| 6,965,891 B1 * | 11/2005 | Jakobsson | G06F 17/3033 707/714 |
| 7,020,661 B1 * | 3/2006 | Cruanes | G06F 17/30498 |
| 9,411,853 B1 * | 8/2016 | Dovrtel | G06F 16/283 |
| 2003/0088540 A1 * | 5/2003 | Edmunds | G06F 17/246 |
| 2006/0218123 A1 * | 9/2006 | Chowdhuri | G06F 17/30445 |
| 2006/0253429 A1 * | 11/2006 | Raghavan | G06F 17/30492 |
| 2008/0033914 A1 * | 2/2008 | Cherniack | G06F 16/24544 |
| 2009/0006320 A1 * | 1/2009 | Ding | G06Q 10/06 |
| 2009/0070303 A1 * | 3/2009 | Beavin | G06F 17/30492 |
| 2012/0005190 A1 * | 1/2012 | Faerber | G06F 17/30404 707/718 |
| 2012/0109934 A1 * | 5/2012 | Weyerhaeuser | G06F 17/30463 707/713 |
| 2012/0166422 A1 * | 6/2012 | Harren | G06F 17/30463 707/718 |
| 2012/0310916 A1 * | 12/2012 | Abadi | G06F 17/30445 707/713 |
| 2013/0159659 A1 * | 6/2013 | Gelman | G06F 16/278 711/173 |
| 2013/0166589 A1 * | 6/2013 | Baeumges | G06F 16/24554 707/769 |

(Continued)

*Primary Examiner* — Tony Mahmoudi
*Assistant Examiner* — Kamal K Dewan
(74) *Attorney, Agent, or Firm* — Fish & Richardson P.C.

(57) ABSTRACT

According to an aspect, a system includes a query engine configured to obtain a multi-provider query model for a query specifying a filter to be applied on provider partitions. The obtained multi-provider query model incorporates a pruning plan. The query engine includes a query optimizer configured to execute the pruning plan during optimization of the multi-provider query model. The pruning plan determines if each of the provider partitions includes content that is required to execute the filter based on pruning information. The query optimizer configured to reduce a scope of the query by excluding at least one provider partition that is determined as not required to execute the filter.

17 Claims, 5 Drawing Sheets

(56) References Cited

U.S. PATENT DOCUMENTS

2015/0120698 A1* 4/2015 Plattner ............ G06F 17/30592
707/714
2015/0286681 A1* 10/2015 Baer ................ G06F 17/30486
707/754

* cited by examiner

DATA DRIVEN MULTI-PROVIDER PRUNING FOR QUERY EXECUTION PLAN

BACKGROUND

A data management system may include relational databases and one or more engines that are used to query the relational databases. A query plan may be a solution to express data flows and calculations on the data of the relational databases. For instance, the query plan is used by a query engine to obtain data from the relational databases in an efficient manner.

The relational database may include a plurality of provider partitions, where each provider partition separately stores data. The data management system may receive a multi-provider query specifying one or more operations on data across multiple provider partitions. Further, the multi-provider request may specify a filter such that a subset of data having one or more filter attributes is requested. However, in order to determine if the data included within each provider partition meets the filter condition, the query engine may have to query each of the partitions resulting in lower processing times.

SUMMARY

According to an aspect, a system includes a query engine configured to obtain a multi-provider query model for a query specifying a filter to be applied on provider partitions. The obtained multi-provider query model incorporates a pruning plan. The query engine includes a query optimizer configured to execute the pruning plan during optimization of the multi-provider query model. The pruning plan determines if each of the provider partitions includes content that is required to execute the filter based on pruning information. The query optimizer configured to reduce a scope of the query by excluding at least one provider partition that is determined as not required to execute the filter.

In some examples, the system may include one or more of the following features (or any combination thereof). The query may be a multi-provider query specifying a union operator on at least two of the provider partitions. The multi-provider query model may be a calculation model having at least one non-relational operator within a calculation flow, and the query engine is a calculation engine. The query engine may execute the query according to the multi-provider query model on the provider partitions that are determined as required by the filter. The pruning information may include a summary of the content for each of the provider partitions. The pruning information may include trivial partitioning information specifying a single value per attribute for each provider partition, and complex pruning information specifying information about the content of each provider partition that is not provided by the trivial partitioning information. The pruning plan may include a logic node providing logic code for evaluating the filter and data source nodes that includes the pruning information for the provider partitions to be evaluated, where a number of data source nodes is dependent upon a complexity of the multi-provider query model. The logic code may be implemented in L script language.

The system may include an in-memory database configured to operate using Structured Query Language (SQL) such that the query is received in an SQL format. The in-memory database includes the query engine and the query optimizer. Also, the system may include a business warehouse system configured to store the pruning information, where the pruning information is published to the in-memory database as partition pruning tables such that the query optimizer can directly access the punning information to execute the pruning plan. In some examples, the query engine and the query optimizer cannot directly access the pruning information stored in the business warehouse system, but publication of the pruning information as the partition pruning tables allows the query engine and the query optimizer directly access to the pruning information. The query engine may be a calculation engine having at least one non-relational operator within a calculation flow. The calculating engine may include filter combination and evaluation logic implemented in C++ such that the filter combination and evaluation logic is exposed as a function in an L script language of the pruning plan.

According to an aspect, a computer program product tangibly embodied on a non-transitory computer-readable storage medium and including executable code that, when executed, is configured to cause at least one processor to receive a multi-provider query at an in-memory database system, and obtain a query model for the multi-provider query specifying a filter to be applied on provider partitions. The obtained query model incorporates a pruning plan. The executable code causes the at least one processor to execute the pruning plan during optimization of the query model, where the pruning plan determines if each of the provider partitions includes content that is relevant to the filter based on pruning information, reduce a scope of the query such that at least one provider partition is excluded from the filter, and execute the multi-provider query with the filter on the provider partitions determined as relevant to the filter.

In some examples, the computer program product may include one or more of the following features (or any combination thereof). The executable code that, when executed, is configured to cause the at least one processor to move the filter downstream in the query model during optimization of the query model, where the pruning plan is executed after the filter is moved downstream. The multi-provider query may be received in a Structured Query Language (SQL) and the filter is identified by WHERE, but the pruning plan is implemented in an L script language. The query model may be a directed acyclic graph (DAG) having a plurality of operator nodes. The executable code to execute the pruning plan may include executable code to receive the filter from the multi-provider query and evaluate the filter for each provider partition. The executable code that, when executed, is configured to cause the at least one processor to publish the pruning information from the business warehouse storage system as column store database tables in the in-memory database system.

According to an aspect, a method for evaluating filters to be applied on provider partitions during query optimization includes receiving a multi-provider query specifying a filter to be applied on provider partitions, obtaining a query model for the multi-provider query, where the obtained query model incorporates a pruning plan, executing the pruning plan during optimization of the query model including determining if each of the provider partitions includes content required by the filter based on pruning information, adjusting at least one filter condition of the filter to exclude at least one of the provider partitions that is determined as not required by the filter, and executing the query with the filter on the provider partitions that are determined as required by the filter.

In some examples, the method may include one or more of the following features (or any combination thereof). The method may include obtaining a results table based on the execution of the pruning plan, where the results table indicates which of the provider partitions are required by the filter and which of the provider partitions are not required by the filter. The pruning information may include trivial partitioning information specifying a single value per attribute for each provider partition, and complex pruning information specifying multiple values for one or more attributes for each provider partition.

The details of one or more implementations are set forth in the accompanying drawings and the description below. Other features will be apparent from the description and drawings, and from the claims.

DETAILED DESCRIPTION

The embodiments provide systems and methods for pruning a filter to be applied on one or more provider partitions of a database based on pruning information such that the number of provider partitions to be executed by the filter during query runtime can be reduced. For example, the database may include a plurality of separate provider partitions, where each provider partition is a separate semantic partition that stores business data. Also, the database may store pruning information that provides a summary of the content of each of the provider partitions (e.g., what type of data is stored by each provider partition). In a non-limiting example, the pruning information includes a first partition pruning table indicating that a first provider partition stores accounting information for the years of 2013 and 2014, and a second partition pruning table indicating that a second provider partition stores accounting information for the years of 2012 and 2013.

In response to a multi-provider query on the database, a query model (e.g., a multi-provider query model) may be instantiated and optimized. Generally, a query model may be a generic query model that provides the framework or template for querying data in the database in an efficient manner. The query model may specify one or more operators or an arrangement of operator nodes in a tree structure. In some examples, the query model is a calculation model (also referred to as a calculation scenario or calculation plan) that performs relatively more complex operations on the data. In the case of multi-provider, the query model may be considered a multi-provider query model because it would provide the query execution flow for queries, retrieving, and/or manipulating data on the partitioned databases. The query model incorporates (or otherwise references) a pruning plan that evaluates the filter of the multi-provider query during optimization of the query model.

During optimization the query model, the pruning plan may be executed such that the pruning plan evaluates the filter to determine which provider partitions are required for execution of the query (and/or which provider partitions are not required for execution of the query), and then adjusts the query model by including the provider partitions which are determined as required and excluding the provider partitions which are determined as not required, thereby reducing the scope of the filter. As such, the efficiency of the query may be improved.

In a non-limiting example, if the query relates to obtaining accounting data for the 2013 year, the filter may be evaluated for each of the provider partitions based on the partition pruning tables, e.g., by determining if the filter is relevant to each of the first provider partition and the second provider partition using the partition pruning tables. Continuing with this example, the results of the pruning plan may indicate that the second provider partition is not required by the filter of the query (e.g., the second provider partition stores accounting data for 2012 and 2013), and therefore may restrict the scope of the query to the first provider partition. Then, after optimization, the optimized query model may be included as part of a query execution plan to be executed on the database such that the first provider partition is queried but not the second provider partition. These and other features of the embodiments are further described with reference to the figures.

Figure 1:
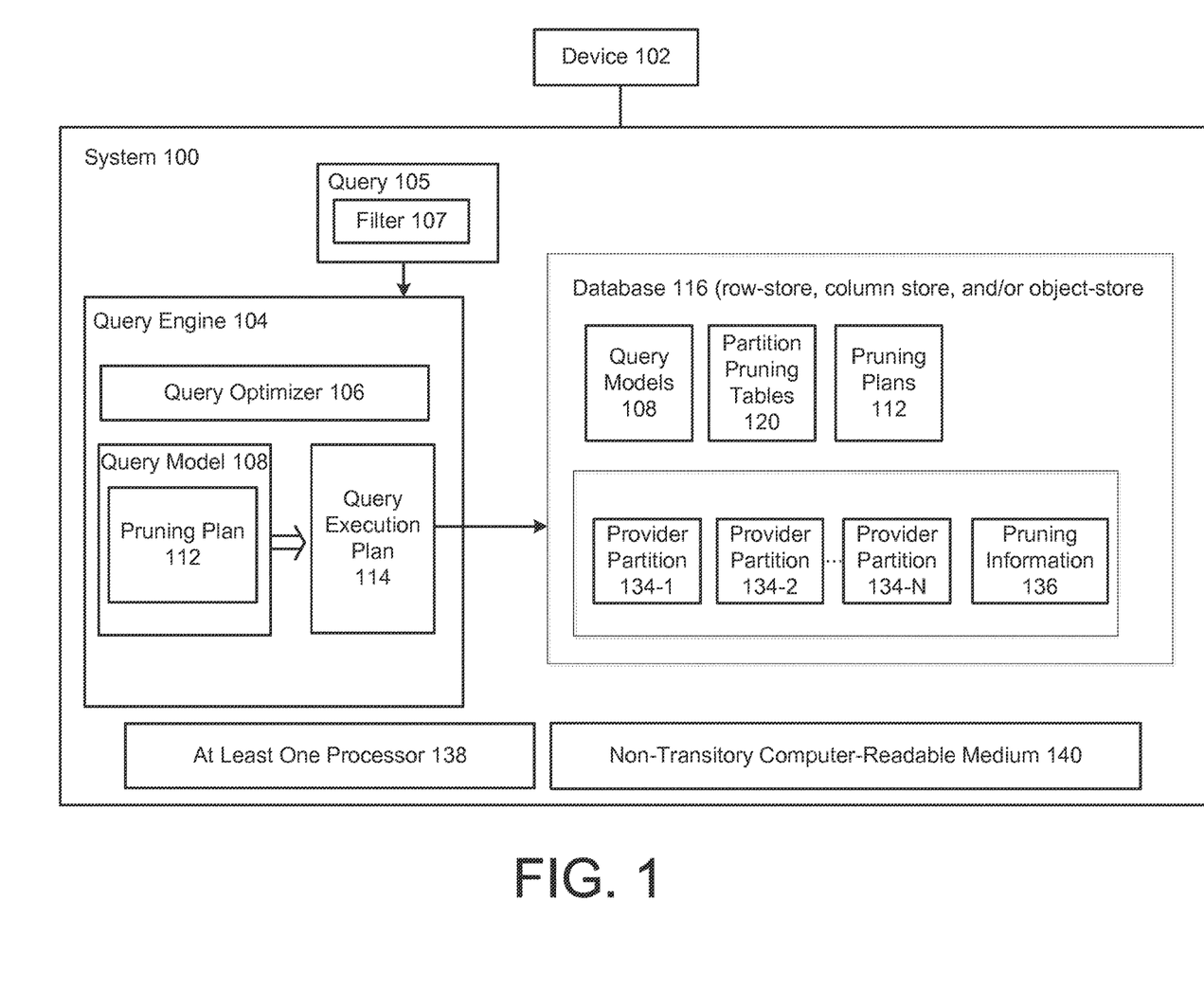
FIG. 1 illustrates a system for evaluating a filter to be applied on provider partitions during optimization of a multi-provider query model according to an aspect.

FIG. 1 illustrates a system 100 for evaluating a filter 107 of a query 105 to be applied on provider partitions 134 published to a database 116 from a business warehouse system during optimization of a query model 108 by determining which of the provider partitions 134 is required by the filter 107 using pruning information 136 and/or partition pruning tables 120 according to an aspect.

The system 100 may be any type of data management system that queries, retrieves, and/or manipulates data from a database 116. In some examples, the system 100 may manage any kind of data within the database 116. The data may include general business data, sales data, accounting data, engineering data, system or process data, scientific data and/or generally any type of data that can be managed within the database 116. In some examples, the management of data by the system 100 may permit a comprehensive business intelligence solution for assisting with business decisions (e.g., predicting a new location to open a store based on existing sales data). The system 100 may be configured to perform complex calculation scenarios and/or analytics on the data stored in the database 116. As such, the data retrieval and computations performed by the system 100 may be relatively complex involving a series of query execution steps, which is compounded by the fact that the database 116 may store a relatively large amount of data across a number of business entities. Also, users of the system 100 typically require the query results rather quickly. Therefore, the manner in which the system 100 queries, retrieves, and manipulates data within a complex database management system 100 is relatively important.

The system 100 may be a relational database management system (RDBMS). In some examples, the system 100 is an in-memory database or in-memory database system. The in-memory database system is a type of database management system that relies on main memory for computer data storage. In contrast, conventional database systems employ a disk storage mechanism. In some examples, the in-memory database includes a combination of main memory and disk storage. Also, the in-memory database system may support real-time analytics and transactional processing including replication and aggregation techniques. Also, within the in-memory database environment, calculation logic is pushed down into the database layer (as opposed to remaining in the application layer) such that the processing time for querying and manipulating the data within the database 116 may be reduced as compared with conventional relational database systems. In some examples, the in-memory database system may be HANA Enterprise 1.0 (any other versions) that is developed by SAP. However, the techniques described herein may be applied to any type of relational database system.

The system 100 may operate in conjunction with Structured Query Language (SQL). Generally, SQL refers to a special-purpose programming language designed for managing data held in a relational database management system including an in-memory database. In some examples, SQL may refer to various types of data related languages including, e.g., a data definition language and a data manipulation language, where a scope of SQL may include data insert, query, update and delete, schema creation and modification, and data access control, and SQL may include procedural elements. Further, in some example implementations, SQL may include descriptions related to various language elements, including clauses, expressions, predicates, queries, and statements. For instance, clauses may refer to various constituent components of statements and queries, and in some instances, clauses may be considered optional. Further, expressions may be configured to produce scalar values and/or tables that include columns and/or rows of data. Also, predicates may be configured to specify conditions that may be evaluated to SQL three-valued logic (3VL) (true/false/unknown) and/or Boolean truth values, which may be used to moderate effects of statements and queries, and which may be used to modify program flow.

The system 100 may include a query engine 104 configured to execute the query 105 on the database 116 according to a query execution plan 114 that includes one or more optimized query models 108 (e.g., optimized by a query optimizer 106). Then, the query engine 104 is configured to return query results of the query 105 to a device 102 communicatively coupled to the system 100. In some examples, the query results may be one or more calculation views that processes and manipulates the data in the database 116. The device 102 may provide a user interface (UI) that receives queries and/or preferences from a user for managing or utilizing the system 100 and displays the query results.

The query 105 may be a request to view, access, and/or manipulate data stored in the database 116. The query 105 may be received at the system 100 from the device 102. Generally, a query 105 is a request for information from the database 116, and the query results may be generated by accessing relevant data from the database 116, and manipulating the relevant data to yield requested information. The database 116 may include one or more database structures or formats such as column-store data storage, row-store data storage, and/or object-store data storage. The database structures may be considered complex, where desired data for the query 105 may be retrieved from the database 116 by accessing data using different ways, with different data structures, and in different orders, which typically affects processing times. For instance, processing times of the same queries may vary depending on the manner in which the data is retrieved and/or selected from the database 116. It is noted that the techniques described herein may be applied regardless of the storage format of the database 116. For instance, the techniques described herein may be applied to the column-store data storage, row-store data storage, or object-store data storage, or any combinations thereof.

The query 105 may specify a filter 107 to be applied to the data of the database 116. Generally, the filter 107 may be an operation to obtain a subset of data in a range of cells or tables. The filter 107 may be a function to reduce a dataset specified by the query 105 to a certain filter attribute. The filter attribute may be a certain range or characteristic. The execution of the filter 107 may obtain the subset of data or reduce the dataset based on one or more filter attributes that may be applied to the data. For instance, the filter 107 returns only the data that matches or otherwise includes the filter attributes. In some examples, the query 105 may be expressed in an SQL format. For instance, the filter 107 may be identified by the phrase "WHERE" followed by one or more filter attributes.

The database 116 may store a plurality of provider partitions 134 published from a business warehouse system. The database 116 may be separate from the business warehouse system. In some examples, the business warehouse system is configured to store data for one or more business entities as the provider partitions 134, and the business warehouse system is configured to publish the provider partitions 134 to the database 116. In some examples, the business warehouse system may include logic for extract, transform, load (ETL), reporting, and planning and analysis logic, which are functionalities integrated or separate from the system 100. In some examples, the business warehouse system may be SAP Business Warehouse developed by SAP. However, the business warehouse system may be any type of business warehouse system having data storage, as well as ETL, reporting, and planning and analysis functionalities.

The provider partitions 134 are semantically partitioned parts of a storage unit. For example, the storage unit may be semantically partitioned into different parts. In some examples, each provider partition 134 is a portion (or part) of the database 116. Each provider partition 134 may be a storage area that is logically or physically separate from the other provider partitions 134. The provider partitions 134—may include a first provider partition 134-1, and a second provider partition 134-2 through N provider partition 134-N, where N may be any integer greater or equal to three.

The query engine 104 is configured to execute the query 105 on one or more of the provider partitions 134. The query 105 is a multi-provider query on the database 116. In some examples, the query may specify a union operator on at least two of the provider partitions 134. In some examples, the query 105 may be a union operation that combines, mergers, or otherwise manipulates data from at least two or more provider partitions 134. In some examples, the query 105 may be considered a special type of union operator that is applied to provider partitions 134 that is referred to as a multi-provider. In order to obtain query results in an efficient matter, the query engine 104 may utilize one or more query models 108 that are instantiated and optimized and included as part of the query execution plan 114 to be executed on the database 116. When processing the multi-provider query, the obtained query model 108 may be considered a multi-provider query model.

The query engine 104 is configured to obtain or otherwise derive the query model 108 in response to the query 105, and then instantiate and optimize the query model 108 to derive the query execution plan 114 which is used to execute the query 105 on the database 116. In particular, at query runtime, all involved query models 108 and the query 105 are combined into a single query execution plan 114. In some examples, the query execution plan 114 is considered an optimized query model 108. In some examples, the query execution plan 114 includes multiple query models 108 that have been optimized. In some examples, the query models 108 may be stacked (or linked) and then optimized to be included within the final runtime query execution plan 114. For example, in order to improve reusability and flexible design, the query models 108 may be stacked to provide even more complex scenarios.

The query engine 104 may include one or more engines. Generally, the query engine 104 may include any type of engine that queries, retrieves, and/or manipulates data from a relational database according to a query plan. In some examples, the query engine 104 may include a join engine, online analytical processing (OLAP) engine, and/or a calculation engine. The join engine may be used to perform all types of joins. In some examples, the join engine may process the query 105 to obtain an attribute view. For example, the attribute views are used to define joins between tables, and explain to the system 100 a reasonable way for these joins to be undertaken. Also, they can also be used to select a subset of columns and rows from a table. In one specific example, an attribute view "Flight" can show Airline Code, Airline Connection Number, and flight date into one object).

The OLAP engine may be used for calculation and aggregation. In some examples, the OLAP engine may process the query 105 to obtain an analytical view. The analytical views are typically defined on at least one fact table that contains transactional data. Using analytic views, one can create a selection of measures, add attributes and join attribute views. The calculation engine may be provided on top of the OLAP engine and/or the join engine. The calculation engine may be used for complex calculations that cannot be accomplished by the join engine or the OLAP engine. The calculation engine may process the query 105 to obtain a calculation view. The calculation view may be a graphical or a scripted calculation view that consumes other analytical, attribute, and/or calculation views and tables. The calculation view may include union, join, projection, and aggregation nodes (or any combination thereof), and provides enhanced features such as distinct, count, calculation, and dynamic joins.

The query model 108 may be a generic query model that provides the framework for querying data in the database 116 in an efficient manner. In some examples, the query model 108 may be referred to as a query plan or query scenario. The query model 108 may be a collection of generic operators designed to accomplish the functions related to the query 105. The query model 108 may be considered a template that provides an outline of the query 105 to be performed on the database 116. The query model 108 may specify one or more operator nodes that encapsulate operations for executing the query 105. In some examples, one or more query models 108 provide the framework for obtaining the attribute, analytic, and calculation views. The operator nodes may be arranged in a tree structure, where results flow from a lower portion of the tree to an upper portion of the tree. Each operator node may include zero or more child nodes, where output from the child nodes are fed as input to related parent nodes. For instance, a join node may include two child nodes that may represent two join operands, whereas a sort node may include a single child node with the input for sorting. Leaves of the tree may include operator nodes that produce results by scanning tables, including performing index scans and/or sequential scans. The query model 108 may be generic in the sense that it may be reusable by subsequent queries.

The query model 108 may be a calculation model (or calculation plan or calculation scenario) that performs relatively more complex operations on the data in order to provide the calculation views. The calculation model may include custom calculation flows that provide enhanced functionality in contrast to standard SQL or relational functions. In some examples, the calculation model may include a directed acyclic graph (DAG) that expresses complex data flows and calculations within the database 116. In some examples, the calculation model includes at least one non-relational operator node that performs a non-relational function. In other examples, the calculation model includes all relational operators. A relational operator (expressed by relational expressions or relational conditions) may be a programming language construct or operator that defines a relation between two entities. There may be many different types of relational operators. In some examples, the relational operators may be equal to, not equal to, greater than, less than, greater than or equal to, less than or equal to, etc. Non-relational operators may be any type of operator not considered relational. In some examples, non-relational operators may include non-relational comparisons, custom expressions, join conditions that do not follow primary/foreign key model, type constructor, field extractor, nest block, unnest block, etc. If the query model 108 is the calculation model, the query engine 104 is the calculation engine which is used to execute the query 105 according to the calculation model.

In response to the query 105, the query engine 104 may parse the query 105, and obtain one or more query models 108 from the database 116. For example, the query engine 104 may obtain the query model 108 from the database 116, which stores a number of different query models, by selecting the query model 108 (or more than one query model 108) that generally corresponds to the type of operations specified by the query 105. In particular, if the query 105 relates to the multi-provider query, the query engine 104 may obtain the multi-provider query model as the query model 108 from the database 116. In other examples, the query engine 104 may create or derive the query model 108 on the fly in response to the query 105. For example, the query engine 104 may derive the query model 108 without obtaining an already-created query model 108 from the database 116.

When processing the multi-provider query, the query model 108 incorporates (or otherwise references) a pruning plan 112 that evaluates the filter 107 of the query 105 during optimization of the query model 108. For example, the query engine 104 includes a query optimizer 106 configured to optimize the query model 108. The query optimizer 106 may include an SQL optimizer. In other examples, the query optimizer 106 includes an optimizer that is executed in a format different from SQL. As part of the optimization procedure, the query optimizer 106 may tailor the query model 108 (which may be relatively generic) to the requested query 105 and process the query model 108 to enable the query model 108 to be executed in an efficient manner. The query optimizer 106 may be configured to output the optimized query model 108 as the query execution plan 114 (or a portion thereof if combined with other query models 108). Then, the query engine 104 may be configured to execute the query execution plan 114 on the provider partitions 134, and provide the query results to the device 102.

During an instantiation operation, the query engine 104 (and/or query optimizer 106) may be configured to merge the query 105 with the query model 108, combine multiple filters, and/or remove unnecessary attributes from the query model 108. For example, if an attribute is not required by the query 105 and is not required by other parts of the query model 108, the query optimizer 106 may be configured to remove that attribute from the query model 108.

Conventionally, a query engine does not necessarily know which provider partition holds the relevant information, and therefore has to query all the provider partitions 134 to properly apply the filter 107 of the query 105. However, according to the embodiments, the business warehouse system may also store pruning information 136 for each of the provider partitions 134-1. For example, the pruning information 136 may specify what type of data is stored in each of the provider partitions 134. In some examples, the pruning information 136 may provide a summary of the content of data stored by each of the provider partitions 134. The pruning information 136 may be maintained and updated by its respective provider in the business warehouse system. For example, the business entities may manage and update the pruning information 136.

The pruning information 136 may include trivial partitioning information and complex pruning information. The trivial partitioning information may be a single constant value providing one single value per attribute. For example, the trivial partitioning information may be a single value per attribute for each provider partition 134. In one specific example, the provider partitions 134 include first provider partition 134-1 storing accounting information for the year 2013, and second provider partition 134-2 storing accounting information for the year 2014. The trivial partitioning information may provide the constant value mapping for the first provider partition 134-1 as single value (2013) to attribute (YEAR), and the constant value mapping for the second provider partition 134-2 as single value (2014) to attribute (YEAR). In some cases, the query engine 104 may access the trivial partitioning information of the pruning information 136, and restrict the query 105 to the first provider partition 134-1 during query runtime if the query 105 requests the accounting information for the year 2013 (e.g., without querying the second provider partition 134-2).

However, in some cases, the trivial partitioning information is not sufficient for more complex queries (especially involving calculation models/calculation views). In a specific example, the first provider partition 134-1 may hold data for two years—2013 and 2014. In this case, it is no longer possible to map the value of the YEAR to a single constant value. The pruning information 136 may be extended to capture the complex pruning information in addition to the trivial partitioning information. The complex pruning information may be configured to capture multiple value relationships (including ranges) for the data stored in each of the provider partitions 134-1.

Also, in some cases, the query engine 104 does not have direct access to the pruning information 136 associated with the business warehouse system. For example, for the view point of the query engine 104, the pruning information 136 stored in the business warehouse system may be seen as a black box. If queries are submitted directly to the business warehouse system, the business data storage system may leverage the pruning information 136 to restrict the query. However, obtaining the benefit of the pruning information 136 during execution of the multi-provider query on the side of the query engine 104 (e.g., calculation engine) is not entirely possible because the pruning information 136 stored in the business warehouse system is not directly accessible by the query engine 104, and therefore makes query optimization relatively difficult.

However, according to various aspects, the pruning information 136 may be published to the database 116 as partition pruning tables 120, thereby making the pruning information 136 directly accessible by the query engine 104. For instance, the pruning information 136 may be transferred, copied, or provided to the database 116, and stored as partition pruning tables 120. The partition pruning tables 120 may be stored in a column data store of the database 116. However, in other examples, the partition pruning tables 120 may be stored in other types of data stores such as a row data store and/or object data store.

Below is a non-limiting example of a partition pruning table 120 for the first provider partition 134-1:

TABLE 1

| YEAR | Accounting Area |
| --- | --- |
| 2013 | US |
| 2013 | ASIA |

Below is a non-limiting example of a partition pruning table 120 for the second provider partition 134-2:

TABLE 2

| Year | Accounting Area |
| --- | --- |
| 2014 | US |
| 2014 | ASIA |
| 2014 | EU |

The query model 108 may be enhanced with the pruning plan 112. For example, the query model 108 may include a series of operators with a multi-provider operator. The multi-provider operator may be enhanced with the pruning plan 112. The pruning plan 112 may include logic for evaluating the filter 107 in view of the provider partitions 134 based on the pruning information 136 provided within the partition pruning tables 120.

In some examples, the logic for the pruning plan 112 is provided in an L script code. The L script logic code may be configured to receive the filter 107 from the query 105 and evaluate the filter 107 for each provider partition 134. The pruning plan 112 may include a logic node (e.g., the L script logic node) and data source nodes that includes the pruning information 136 for the provider partitions 134 to be evaluated, where the number of data source nodes is dependent upon the complexity of the multi-provider query model. In some examples, the query engine 104 is implemented as the calculation engine, and the calculation engine includes filter combination and evaluation logic implemented in C++ such that the filter combination and evaluation logic is exposed as a function in the L-script language of the pruning plan 112, thereby achieving better efficiency.

During optimization of the query model 108, the pruning plan 112 is executed such that the pruning plan 112 evaluates the filter 107 to determine which provider partitions 134 are required by the filter 107 and/or which provider partitions 134 are not required by the filter 107, and then adjusts the filter 107 by including the provider partitions 134 which are determined as required and excluding the provider partitions 134 which are determined as not required, thereby reducing the scope of the filter 107.

Adjustment of the filter 107 may involve changing the filter conditions of the filter 107. For example, if the query 105 relates to obtaining accounting data for the 2013 year, the filter 107 may be evaluated for each of the provider partitions 134 based on the partition pruning tables 120, e.g., by determining if the filter 107 is relevant to each of the first provider partition 134-1 and the second provider partition 134-2 based on the partition pruning tables 120. In some examples, the pruning plan 112 may determine that the second provider partition 134-2 is not required by the query 105 (e.g., the second provider partition 134-2 stores accounting data for the year 2014), and therefore may restrict the scope of the filter 107 to the first provider partition 134-1.

In another example, the query 105 may be the following SELECT statement:

SELECT sum (Sales), ACCOUNTING_AREA FROM MULTIPROV_SCENARIO WHERE ACCOUNTING_AREA="EU" GROUP BY ACCOUNTING AREA Conventionally, the first provider partition 134-1 and the second provider partition 134-2 would be queried. However, according to the embodiments, the query optimizer 106 inputs the filter 107 (ACCOUNTING AREA='EU') into the pruning plan 112 of the query model 108. For example, the query 105 may specify MULTIPROV_SCENARIO, and the query optimizer 106 may be configured to obtain the query model 108 (named MULTIPROV_SCENARIO) and instantiate the query model 108 by merging the query 105 with the query model 108. The query optimizer 106 may be configured to perform one or more optimization operations on the instantiated query model 108 such as combining multiple filters, removing unnecessary attributes (e.g., not required by the query 105), pushing down the filter within the multi-provider query model 108, etc. At this point, at least one of the operators of the query model 108 includes the multi-provider operator which is linked or enhanced with the pruning plan 112. During the optimization, the pruning plan 112 is executed.

During the execution of the pruning plan 112, the pruning plan 112 evaluates the filter 107 for each of the provider partitions 134 based on its script. In some examples, the pruning plan 112 indicates to obtain the partition pruning tables 120 for each of the provider partitions 134. Then, the pruning plan 112 evaluates the filter 107 in view of the partition pruning tables 120 to determine which provider partitions 134 are relevant to the filter 107. Referring to Tables 1 and 2, the evaluation of the filter 107 in view of the partition pruning tables 120 may result in the following table:

TABLE 3

| First Provider Partition | X |
| Second Provider Partition | — |

Based on the above results table, the query optimizer 106 may determine that the first provider partition 134-1 is not required by the query 105 ("X"), but the second provider partition 134-2 is required by the query 105 ("-"). With this information, the filter 107 specified in the query model 108 may be reduced to only the second provider partition 134-2 during query runtime of the query execution plan 114. For example, within the query model 108, the relevant operator is revised such that the query 105 is restricted to the second provider partition 134-2 but not the first provider partition 134-1.

Also, in some examples, during optimization of the query model 108, the query optimizer 106 is configured to push down the filter 107 within the query model 108 (referred to as filter push down). Also, in some examples, if the query model 108 and/or the query 105 include multiple filters 107, the query optimizer 106 may be configured to combine them into one or more filters 107 (referred to as filter combination). Also, in some examples, the query optimizer 106 may be configured to remove one or more filter attributes from other operators that are not required by the query 105. In some examples, after, the filter 107 is pushed down, multiple filters are combined, and/or filter attributes (and/or unnecessary attributes) are removed, the optimized/combined filter 107 may be inputted into the pruning plan 112 to be evaluated.

In some examples, the query engine 104, the query optimizer 106, and the database 116 are implemented within the in-memory database system. For example, the query engine 104, the query optimizer 106, and the database 116 are implemented at the database level. If an application solution is implemented with a three tier solution (e.g., interface, application server, and database), the query engine 104, the query optimizer 106, and the database 116 are implemented in the database level as opposed to the application server or the interface (web interface). In these examples, one or more database clients (e.g., application servers, web applications, etc.) may interact with the in-memory database by submitting queries and receiving query results. In other examples, the query engine 104, the query optimizer 106, and the database 116 are implemented as part of a relational database system such that these components may be distributed across multiple devices or layers or included within a single device or layer.

The system 100 may include at least one processor 138, and a non-transitory computer-readable medium 140 storing executable code that, when executed by the at least one processor 138, is configured to implement the components and functionalities of the system 100 including the query engine 104 and the query optimizer 106. The non-transitory computer-readable medium 140 may include one or more non-volatile memories, including, by way of example, semi-conductor memory devices, e.g., EPROM, EEPROM, and flash memory devices; magnetic disks, e.g., internal hard disks or removable disks, magneto optical disks, and CD ROM and DVD-ROM disks. Also, the non-transitory computer-readable medium 140 may include any devices configured as main memory and/or disk storage. The at least one processor 138 may include any type of general purpose computing circuitry or special purpose logic circuitry, e.g., an FPGA (field programmable gate array) or an ASIC (application specific integrated circuit). Also, the at least one processor 138 may be one or more processors coupled to one or more semi-conductor substrates.

Figure 2A:
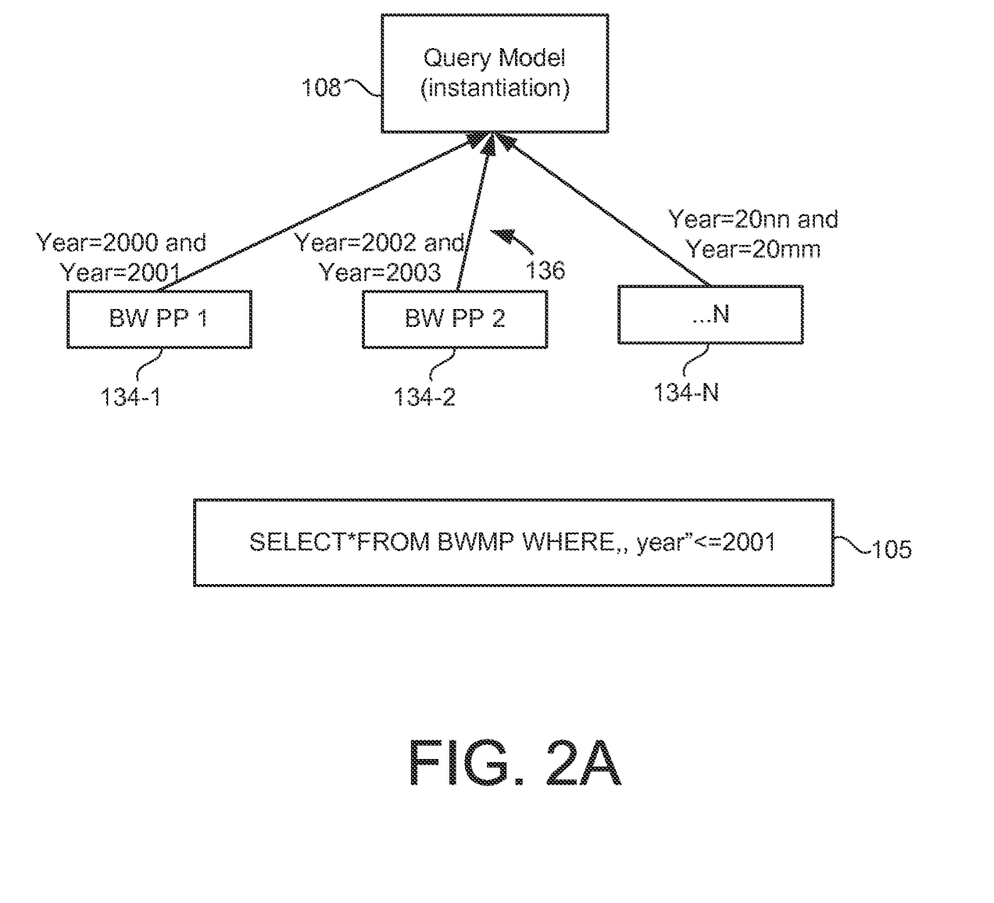
FIG. 2A illustrates a perspective of an instantiated multi-provider query model according to an aspect.

FIG. 2A illustrates a perspective of an instantiated query model 108 (multi-provider query model) for the query 105 according to an aspect. In FIG. 2A, the pruning information 136 for each of the provider partitions 134 (the first provider partition 134-1, and the second provider partition 134-2 through N provider partition 134-N). With respect to the first provider partition 134-1, the pruning information 136 is depicted as the year=2000 and the year=2001. For instance, the first provider partition 134-1 stores data related to the year 2000 and the year 2001. With respect to the second provider partition 134-2, the pruning information 136 is depicted as the year 2002 and the year 2003. For instance, the second provider partition 134-2 stores data related to the year 2002 and the year 2003. The other provider partitions (e.g., through Nth provider partitions 134-N) have associated data for the year 20 nn and 200 mm. The query 105 may be in a format of SQL. The query 105 may specify the query model 108 related to "BWMP"—business warehouse multi-provider), and contained the filter 107 identified by the WHERE phrase—"year<=2001."

Figure 2B:
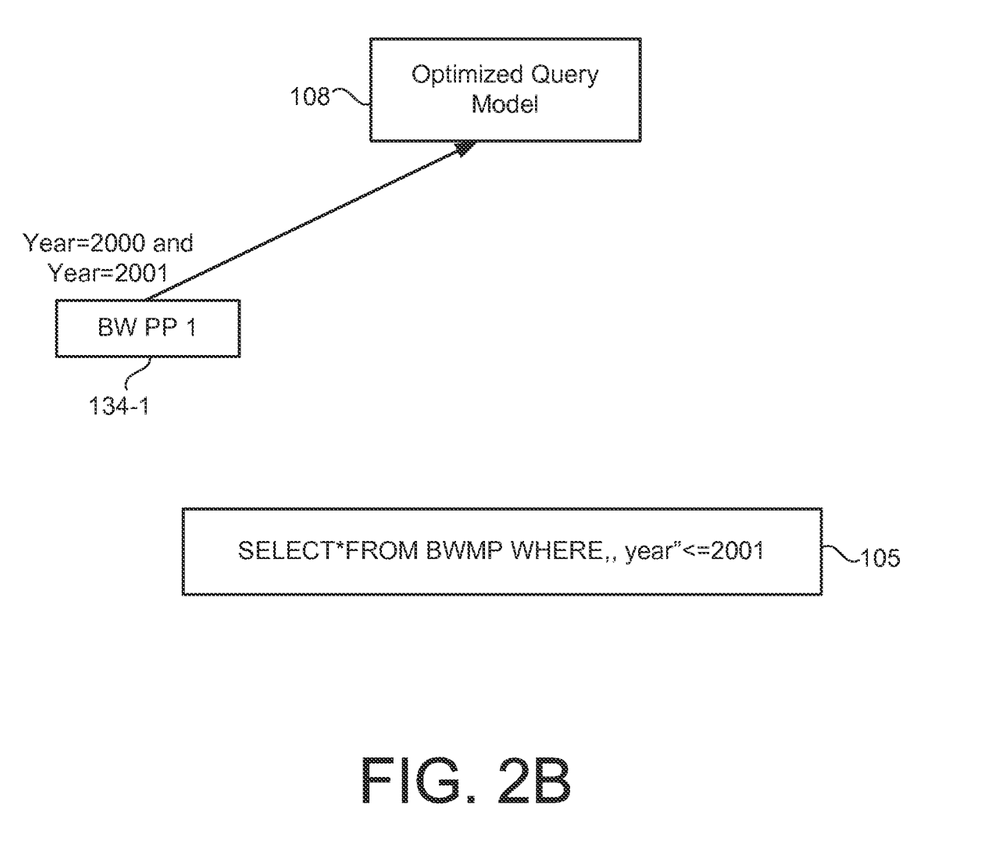
FIG. 2B illustrates a perspective of an optimized multi-provider query model that executed the pruning plan according to an aspect.

FIG. 2B illustrates a perspective of an optimized query model 108 for the query 105 after optimization including the execution of the pruning plan 112 according to an aspect. For example, after optimization (e.g., after executing the pruning plan 112), the query model 108 may be pruned to exclude the provider partitions 134 except the first provider partition 134-1 because the second through Nth provider partition 134 does not contain data related to the year 2001.

Figure 3:
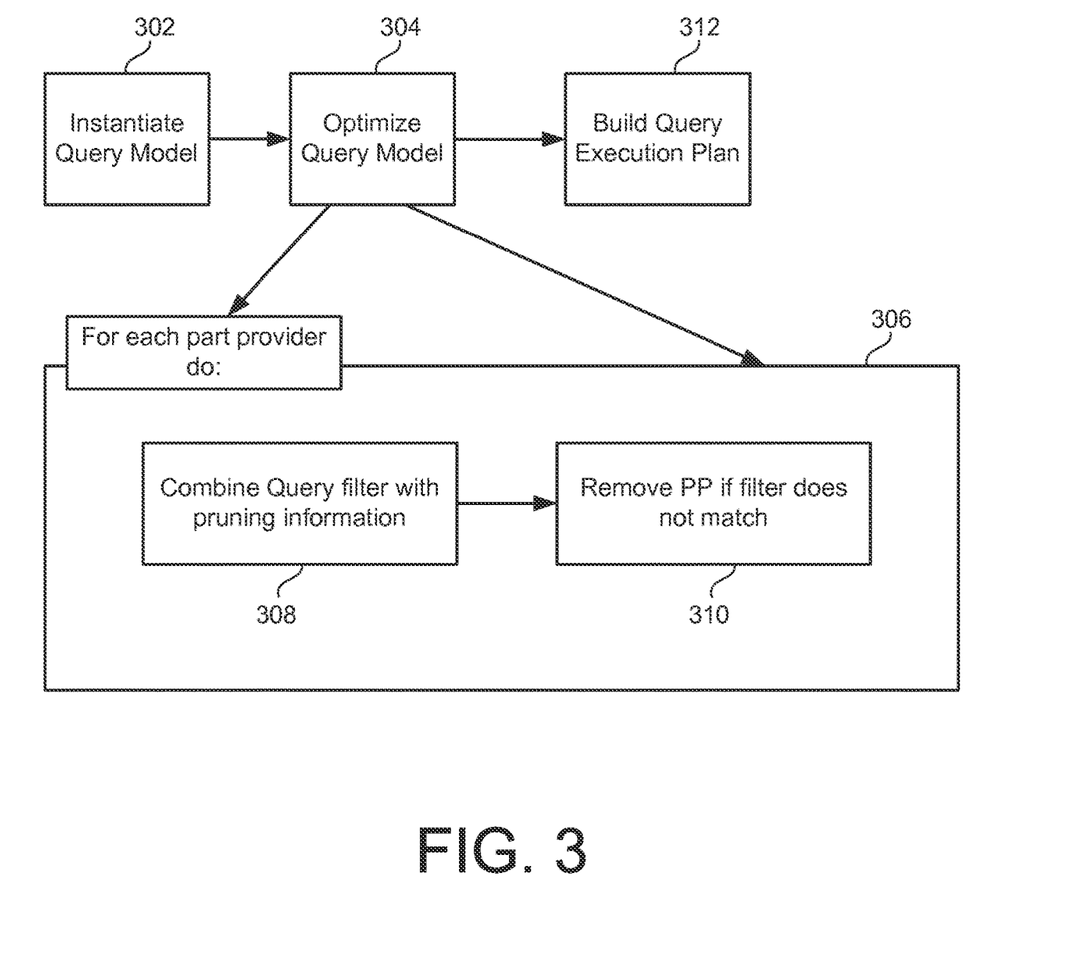
FIG. 3 is a flowchart illustrating example operations of the system of FIG. 1 according to an aspect.

FIG. 3 is a flowchart illustrating example operations of the system 100 of FIG. 1 according to an aspect. Although FIG. 3 is illustrated as a sequential, ordered listing of operations, it will be appreciated that some or all of the operations may occur in a different order, or in parallel, or iteratively, or may overlap in time.

In operation 302, the query optimizer 106 may be configured to instantiate the query model 108. For example, the query optimizer 106 may be configured to obtain the multi-provider query model as the query model 108 for the query 105, and instantiate the query model 108 by merging the multi-provider query model 108 with the query 105. As part of the instantiation, the query optimizer 106 may be configured to remove unnecessary attributes, combine filters, and/or push down the filter 107 within the query execution flow or calculation flow of the query model 108.

In operation 304, the query optimizer 106 may be configured to optimize the query model 108. As part of the optimization, in operation 306, the query optimizer 106 may be configured to execute the pruning plan 112. For example, in operation 308, the query optimizer 106 may be configured to combine the filter 107 with the pruning information 136 as provided in the pruning plan 112. In operation 310, the query optimizer 106 may be configured to evaluate the filter 107 by removing the provider partition 134 if the filter 107 does not match in the manner previously explained above. After the query model 108 is optimized, the query optimizer 106 may construct the query execution plan 114.

Figure 4:
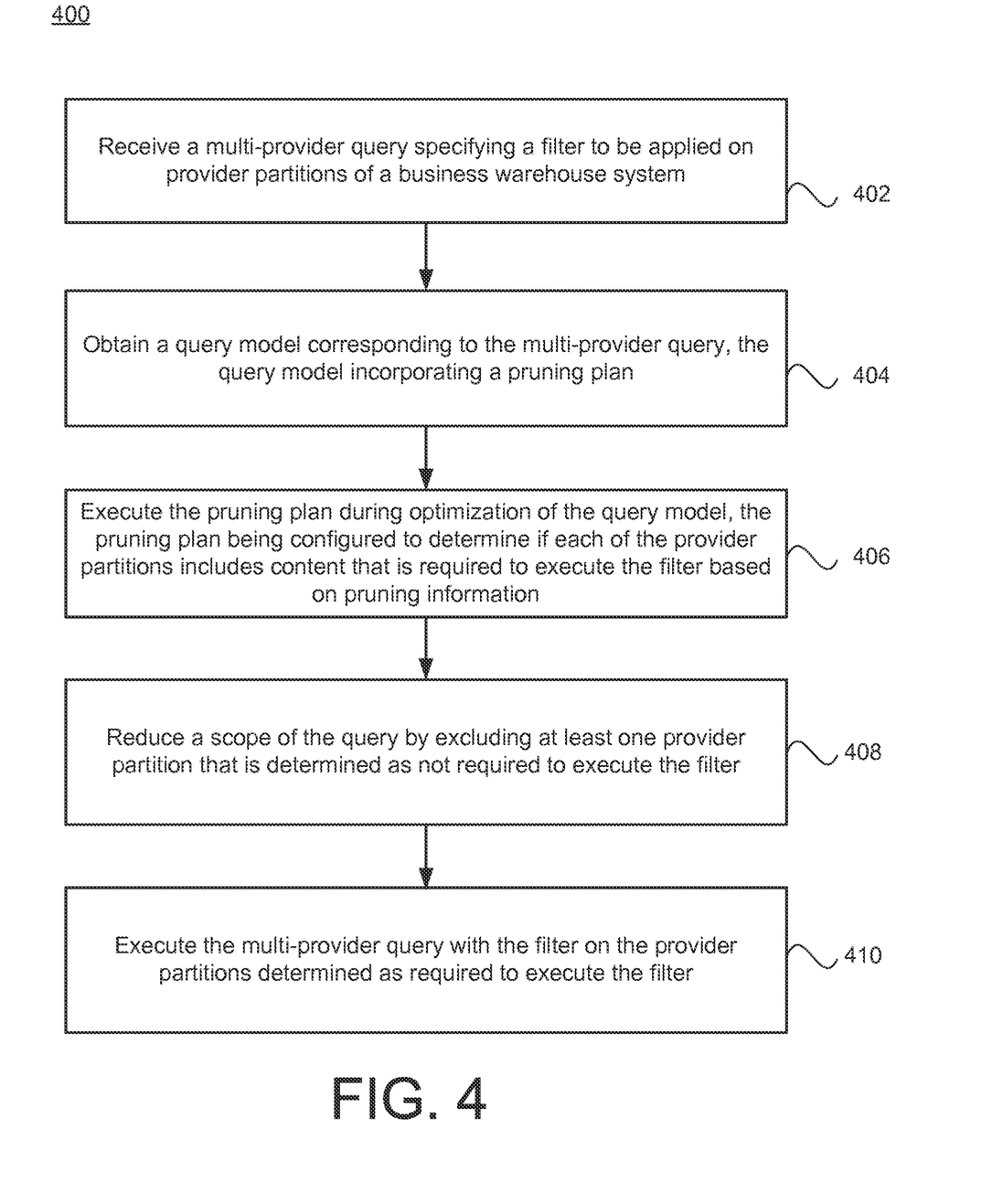
FIG. 4 is a flowchart illustrating example operations of the system of FIG. 1 according to an aspect.

FIG. 4 is a flowchart illustrating example operations of the system 100 of FIG. 1 according to an aspect. Although FIG. 4 is illustrated as a sequential, ordered listing of operations, it will be appreciated that some or all of the operations may occur in a different order, or in parallel, or iteratively, or may overlap in time.

A multi-provider query may be received, where the multi-provider query specifies a filter to be applied on provider partitions published from a business warehouse system (402). For example, the query engine 104 is configured to receive the multi-provider query 105. The multi-provider query 105 may specify the filter 107 to be applied on provider partitions 134.

A query model may be obtained that corresponds to the multi-provider query, where the query model incorporates a pruning plan (404). The query engine 104 is configured to obtain the query model 108 corresponds to the multi-provider query 105. The query model 108 incorporates or otherwise references the pruning plan 112.

The pruning plan may be executed during optimization of the query model, where the pruning plan is configured to determine if each of the provider partitions includes content that is required to execute the filter based on pruning information (406). The query optimizer 106 may be configured to execute the pruning plan 112 during optimization of the query model 108. The pruning plan 112 is configured to determine if each of the provider partitions 134 includes content that is required to execute the filter 107 based on the pruning information 136.

A scope of the filter may be reduced by excluding at least one provider partition that is determined as not required to execute the filter (408). The query optimizer 106 is configured to reduce the scope of the filter 107 by excluding at least one of the provider partitions 134 that is determined as not required to execute the filter 107.

The multi-provider query with the filter may be executed on the provider partitions determined as required to execute the filter (410). The query engine 104 is configured to execute the multi-provider query 105 with the filter 107 on the provider partitions 134 according to the optimized query model 108, where the filter 107 is applied to the provider partitions determined as required to execute the filter 107.

Implementations of the various techniques described herein may be implemented in digital electronic circuitry, or in computer hardware, firmware, software, or in combinations of them. Implementations may implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the embodiments.

What is claimed is:

1. A system for evaluating filters to be applied on provider partitions during query optimization within a calculation engine, the system comprising:
    at least one processor; and
    a non-transitory computer-readable medium configured to store executable instructions that when executed by the at least one processor are configured to implement:
        an in-memory database system configured to receive pruning information about a plurality of provider partitions from a storage system, the in-memory database system configured to store the received pruning information as a plurality of partition pruning tables, the plurality of partition pruning tables including a first partition pruning table and a second partition pruning table, the plurality of provider partitions including a first provider partition and a second provider partition, the first partition pruning table storing information about the contents of the first provider partition, the second partition pruning table storing information about the contents of the second provider partition, wherein the information stored within the first provider partition and the information stored within second provider partition include information more than a single value per partition, wherein each provider partition is associated with a particular provider and contains data stored for the particular provider, and wherein each provider provides and maintains the pruning information for each respective provider partition, the in-memory database system including:
            a calculation engine configured to obtain a calculation model for a multi-provider query specifying a filter to be applied on the plurality of provider partitions, the calculation model including a plurality of operators configured to execute the multi-provider query, the plurality of operators including at least one non-relational operator, the calculation model incorporating a pruning plan having logic code for evaluating the filter, the logic code of the pruning plan being executed in a computer-programming format different than a structured query language (SOL) format of the multi-provider query, the calculation engine including a query optimizer configured to execute the pruning plan, during optimization of the calculation model, and before execution of the calculation model, wherein executing the pruning plan includes:
                inputting the filter into the pruning plan;
                after inputting the filter into the pruning plan, determining whether the contents of the first provider partition and the contents of the second provider partition are required to execute the filter based on the first partition pruning table and the second partition pruning table; and
                in response to determining that the first provider partition is required by the filter and determining that the second provider partition is not required by the filter when one or more filter attributes of the filter do not match the information from the second partition pruning table, updating the filter to reduce a scope of the multi-provider query by excluding the second provider partition; and
            the calculation engine further configured to execute the calculation model without querying the second provider partition.

2. The system of claim 1, wherein at least one of the plurality of operators of the calculation model includes a union operator on at least two of the plurality of provider partitions.

3. The system of claim 1, wherein the plurality of operators of the calculation model include a first operator and a second operator, the second operator located downstream from the first operator, the query optimizer configured to push the filter downstream to the second operator.

4. The system of claim 1, wherein the pruning plan includes an L script logic node and a plurality of data source nodes, wherein a number of the plurality of data source nodes is dependent upon a complexity of the calculation model.

5. The system of claim 1, wherein the computer-programming format of the logic code of the pruning plan is L script language code.

6. The system of claim 1, wherein the calculation engine and the query optimizer cannot directly access the pruning information stored in the storage system, but receiving and storing the pruning information as the plurality of partition pruning tables allows the calculation engine and the query optimizer to directly access to the pruning information.

7. The system of claim 1, wherein the calculation engine includes filter combination and evaluation logic implemented in C++ such that the filter combination and evaluation logic is exposed as a function in an L script language of the pruning plan.

8. A computer program product tangibly embodied on a non-transitory computer-readable storage medium and including executable code that, when executed, is configured to cause at least one processor to:
    receive, at an in-memory database system and from a storage system, pruning information about a plurality of provider partitions;
    store the received pruning information as a plurality of partition pruning tables in the in-memory database system, the plurality of partition pruning tables including a first partition pruning table and a second partition pruning table, the plurality of provider partitions including a first provider partition and a second provider partition, the first partition pruning table storing information about the contents of the first provider partition, the second partition pruning table storing information about the contents of the second provider partition, wherein the information stored within the first provider partition and the information stored within second provider partition include information more than a single value per partition, wherein each provider partition is associated with a particular provider and contains data stored for the particular provider, and wherein each provider provides and maintains the pruning information for each respective provider partition;

receive a multi-provider query at the in-memory database system;

obtain, by a calculation engine of the in-memory database system, a calculation model for the multi-provider query, the multi-provider query specifying a filter to be applied on the plurality of provider partitions, the calculation model including a plurality of operators configured to execute the query, the plurality of operators including at least one non-relational operator, the calculation model incorporating a pruning plan having logic code for evaluating the filter, the logic code of the pruning plan being implemented in a computer-programming format different than a structured query language (SOL) format of the multi-provider query;

execute the pruning plan, by a query optimizer of the calculation engine during optimization of the calculation model, and before execution of the calculation model, wherein execution of the pruning plan includes:
  inputting the filter into the pruning plan; and
  after inputting the filter into the pruning plan, determining whether the contents of the first provider partition and the contents of the second provider partition are required to execute the filter based on the first partition pruning table and the second partition pruning table; and in response to determining that the first provider partition is required by the filter and determining that the second provider partition is not required by the filter when one or more filter attributes of the filter do not match the information from the second partition pruning table:
  update the filter to reduce a scope of the multi-provider query by excluding the second provider partition; and
  execute the calculation model for the multi-provider query without querying the second provider partition.

9. The computer program product of claim 8, wherein the executable code that, when executed, is configured to cause the at least one processor to:
  move the filter downstream in the calculation model during optimization of the calculation model, wherein the pruning plan is executed after the filter is moved downstream.

10. The computer program product of claim 8, wherein the computer-programming format for the logic code of the pruning plan is L script language code.

11. The computer program product of claim 8, wherein the calculation model is a directed acyclic graph (DAG), and the plurality of operators are arranged in a tree structure.

12. The computer program product of claim 8, wherein at least one of the plurality of operators of the calculation model is linked with the pruning plan.

13. A method for evaluating filters to be applied on provider partitions during query optimization within a calculation engine, the method being performed by at least one processor, the method comprising:

receiving, at an in-memory database system and from a storage system, pruning information about a plurality of provider partitions;

storing the received pruning information as a plurality of partition pruning tables in the in-memory database system, the plurality of partition pruning tables including a first partition pruning table and a second partition pruning table, the plurality of provider partitions including a first provider partition and a second provider partition, the first partition pruning table storing information about the contents of the first provider partition, the second partition pruning table storing information about the contents of the second provider partition, wherein the information stored within the first provider partition and the information stored within second provider partition include information more than a single value per partition, wherein each provider partition is associated with a particular provider and contains data stored for the particular provider, and wherein each provider provides and maintains the pruning information for each respective provider partition;

receiving, at the in-memory database system, a multi-provider query specifying a filter to be applied on the plurality of provider partitions;

obtaining, by a calculation engine of the in-memory database system, a calculation model for the multi-provider query, the calculation model including a plurality of operators configured to execute the multi-provider query, the plurality of operators including at least one non-relational operator, the calculation model incorporating a pruning plan having logic code for evaluating the filter, the pruning plan being linked to one of the plurality of operators, the logic code of the pruning plan being implemented in a computer-programming format different than a structured query language (SOL) format of the multi-provider query;

executing the pruning plan, by a query optimizer of the calculation engine during optimization of the calculation model, and before execution of the calculation model, wherein executing the pruning plan includes:
  inputting the filter into the pruning plan; and
  after inputting the filter into the pruning plan, determining whether the contents of the first provider partition and the contents of the second provider partition are required to execute the filter based on the first partition pruning table and the second partition pruning table; and in response to determining that the first provider partition is required by the filter and determining that the second provider partition is not required by the filter when one or more filter attributes of the filter do not match the information from the second partition pruning table:
  adjusting at least one filter condition of the filter to exclude the second provider partition; and
  executing the calculation model for the multi-provider query without querying the second provider partition.

14. The method of claim 13, further comprising:
  obtaining a results table based on the execution of the pruning plan, the results table indicating which of the plurality of provider partitions are required by the filter and which of the plurality of provider partitions are not required by the filter.

15. The system of claim 1, wherein one of the plurality of operators of the calculation model is linked with the pruning plan.

16. The computer program product of claim 8, wherein the pruning plan includes an L script logic node and a plurality of data source nodes.

17. The method of claim 13, wherein the pruning plan includes an L script logic node and a plurality of data source nodes.

* * * * *